United States Patent
Kimiabeigi

(10) Patent No.: US 9,553,536 B2
(45) Date of Patent: Jan. 24, 2017

(54) STATOR ARRANGEMENT AND ELECTRICAL GENERATOR

(71) Applicant: Mohammad Kimiabeigi, Sheffield (GB)

(72) Inventor: Mohammad Kimiabeigi, Sheffield (GB)

(73) Assignee: SIEMENS AKTIENGESELLSCHAFT, München (DE)

(*) Notice: Subject to any disclaimer, the term of this patent is extended or adjusted under 35 U.S.C. 154(b) by 196 days.

(21) Appl. No.: 13/937,273

(22) Filed: Jul. 9, 2013

(65) Prior Publication Data

US 2014/0015498 A1   Jan. 16, 2014

(30) Foreign Application Priority Data

Jul. 10, 2012  (EP) .................................... 12175750

(51) Int. Cl.
| | |
|---|---|
| *H02P 9/02* | (2006.01) |
| *H02K 3/28* | (2006.01) |
| *H02K 11/00* | (2016.01) |
| *H02K 11/04* | (2016.01) |
| *H02K 7/18* | (2006.01) |

(52) U.S. Cl.
CPC . *H02P 9/02* (2013.01); *H02K 3/28* (2013.01); *H02K 11/046* (2013.01); *H02K 7/1838* (2013.01); *H02K 2213/03* (2013.01); *H02K 2213/06* (2013.01); *H02K 2213/12* (2013.01)

(58) Field of Classification Search
CPC .......................................... H02K 47/00–47/30

USPC ........................................................... 322/90

See application file for complete search history.

(56) References Cited

U.S. PATENT DOCUMENTS

| | | | |
|---|---|---|---|
| 2003/0011268 A1* | 1/2003 | Even et al. | 310/179 |
| 2006/0103137 A1 | 5/2006 | Wobben | |
| 2007/0018525 A1* | 1/2007 | Cai et al. | 310/184 |
| 2007/0057592 A1* | 3/2007 | Bhargava | 310/184 |
| 2008/0103632 A1* | 5/2008 | Saban et al. | 700/286 |
| 2008/0272669 A1* | 11/2008 | Mohle et al. | 310/198 |
| 2010/0133816 A1 | 6/2010 | Abolhassani | |

FOREIGN PATENT DOCUMENTS

| | | |
|---|---|---|
| CN | 1462502 A | 12/2003 |
| CN | 101356708 A | 1/2009 |
| CN | 101702957 A | 5/2010 |
| CN | 102171449 A | 8/2011 |
| WO | WO 8403400 A1 | 8/1984 |
| WO | WO 2011148058 A2 | 12/2011 |

OTHER PUBLICATIONS

Wildi Theodore: "Electrical Machines, Drives, and Power Systems (Fifth Edition)"; textbook material published 2002; ISBN 0-13-098637-2; pp. 285-286; 2002.

* cited by examiner

*Primary Examiner* — Thomas Truong

(57) ABSTRACT

A stator arrangement includes a stator extending in a circumferential direction and plural teeth alternating with plural slots arranged along the circumferential direction. A first wire is arranged in a first slot of the plural slots. A second wire is arranged in a second slot of the plural slots, wherein the second slot is circumferentially adjacent to the first slot. A first converter has an input terminal connected to the first wire and a second converter has an input terminal connected to the second wire.

13 Claims, 4 Drawing Sheets

STATOR ARRANGEMENT AND ELECTRICAL GENERATOR

CROSS REFERENCE TO RELATED APPLICATIONS

The present application claims priority to European Patent Application No. 12175750.4 EP filed Jul. 10, 2012, the entire content of which is hereby incorporated herein by reference.

FIELD OF INVENTION

The present invention relates to a stator arrangement and to an electromechanical transducer, in particular electric generator, comprising the stator arrangement, wherein parallel phases are arranged at circumferentially different positions of the stator.

ART BACKGROUND

A stator arrangement may be utilized for constructing an electric generator for producing electric energy from a rotational mechanical energy, such as a rotational energy provided by a wind turbine. The wind turbine shaft may drive a rotor having plural permanent magnets. The plural magnets may inductively couple to plural coils arranged at the stator, wherein the coils may correspond to two or more electric phases. The two or three or more phases or the corresponding wires may be connected to a converter, in particular a AC-DC-AC converter for converting a variable frequency AC power stream to a fixed frequency AC power stream, in particular via first converting the variable frequency AC power stream to a DC power stream and from there converting to the fixed frequency AC power stream.

If there is a fault in the converter or at one of the wires corresponding to one of the phases, the whole electric energy generating machine has to be shutdown. Thereby, no electrical energy is produced anymore.

There may be a need for a stator arrangement and for an electromechanical transducer, in particular electric generator, wherein the reliability and total amount of energy production during a 20 years life time is increased, fractional power delivery mode is fulfilled by low structural vibration and acoustic noise emission, and wherein in particular a risk or degree of demagnetization of the plural permanent magnets is reduced. In particular, there may be a need for an electric generator, which requires permanent magnets which have a lower amount of dysprosium compared to a conventional permanent magnet, thereby achieving a cost-effective electric generator.

SUMMARY OF THE INVENTION

This need is solved by the subject matter of the independent claims. The dependent claims specify advantageous embodiments of the present invention.

According to an embodiment of the present invention it is provided stator arrangement, the arrangement comprising: a stator extending in a circumferential direction and having plural teeth alternating with plural slots arranged along the circumferential direction; a first wire arranged in a first slot of the plural slots; a second wire arranged in a second slot of the plural slots, wherein the second slot is circumferentially adjacent to the first slot (in particular such that one tooth of the plural teeth is circumferentially between the first slot and the second slot and in particular such that no other slot is between the first slot and the second slot); a first converter having an input terminal connected to the first wire; and a second converter having an input terminal connected to the second wire.

The stator may be represent a circumferential segment (such as spanning an angle range between 10° and 60°, for example spanning an angle range of 30°, 45°, 90° or 180°). Alternatively, the stator may represent a complete circumference, thus being of a closed annular shape. The circumferential direction may be perpendicular to a radial direction and perpendicular to an axial direction. A rotor carrying plural permanent magnets may rotate around a rotation axis which may be parallel or coincident with the axial direction. The stator may comprise a yoke extending in the circumferential direction (either a circumferential segment or a closed annulus) from which yoke the plural teeth protrude radially inwards or outwards. The stator may be manufactured from a material which is magnetically permeable, in order to confine or at least condense or focus magnetic field lines within the stator, in particular within the teeth of the stator.

The first wire and also the second wire may comprise conductive material in any cross-section (for example circular cross-section, rectangular cross-section or trapezoid cross-section) which may be covered with an isolating layer, in order to avoid galvanic conduction between adjacent portions of the first wire and the second wire, respectively, when the first wire and the second wire is wound around protrusions (i.e. the teeth) between the slots in a number of turns.

The first wire within the first slot may be substantially at the same axial position as the second wire between or within the second slot. Further, the first wire may be at a substantially same radial position as the second wire arranged in the second slot. In other embodiments the first wire and the second wire between the or within the first slot and the second slot, respectively, may have different axial positions and/or different radial positions. In any case the first wire in the first slot is at a different circumferential position than the second wire in the second slot. Further, the first slot is at a different circumferential position than the second slot.

The first converter may be substantially independent from the second converter or one of the first converter and the second converter may be a master converter and the other of the first converter and the second converter may be a slave converter. The first converter and also the second converter may have more than one input terminal, in particular may have as many input terminals as the number of supported electric supported. In particular, the first converter may have two input terminals or three input terminals and also the second converter may have two input terminals or three input terminals. Further, the first converter and also the second converter may have two output terminals or three output terminals for providing two phases or three phases of a fixed frequency output AC power stream. The output power streams of the first converter and the second converter may be appropriately combined and may be provided, in particular via one or more transformers, to a utility grid which distributes electric energy to a plurality of electrical consumers.

When one of the first wire, the second wire, the first converter and the second converter fails or exhibits a malfunction the respective other converter and respective other wire may still be functioning and may still be used for operating the stator arrangement, in particular in an electric generator. Thereby, the delivery of the energy production may be increased.

Further, the first wire and the second wire may be magnetically isolated from each other due to the protrusion or tooth circumferentially in between the first slot and the second slot. This tooth may confine magnetic flux or magnetic field lines and may thus contribute to the mutual magnetic independence of the first wire and the second wire.

By the constitution of the first wire arranged at a first circumferential position and the second wire arranged at a second circumferential position which is different from the first circumferential position a level of a demagnetization field which may in the conventional system impair the permanent magnets, may be reduced and significantly cheaper magnets are enabled which have less rare materials, such as Dysprosium, etc.

Dysprosium may add to the coercivity of magnets which is needed to maintain the magnetization of magnets when they are exposed to large demagnetization fields, in particular during a short circuit in the first wire or the second wire. Thereby, Dysprosium is by far the most expensive component of magnets, such as those used in most direct drive permanent magnet wind turbine generators.

Further, the multi-converter arrangement may comprise two, three, four or even more converters being connected to a corresponding number of wires (for each phase).

The number of slots per stator pole may be equal to the number of supported phases times the number of converters.

Circumferentially between the first slot and the second slot a tooth is arranged.

According to an embodiment of the present invention the first wire is connected in a same orientation to the first converter as the second wire is connected to the second converter.

For example, the first wire may be arranged in a manner of an inward direction or an outward direction (defining opposite axial directions when considering the orientation or direction of the respective wires in the first slot and the second slot, respectively). Further, the second wire may be also in the inward direction or the outward direction. Thus a first current flowing in the first wire and a second current flowing in the second wire, when the stator arrangement is employed in an electric generator, are in the same direction, albeit having a phase difference in between which depends on the difference of the circumferential position of the first wire and the second wire.

According to an embodiment of the present invention the first wire is arranged in the first slot in plural turns forming a first coil, wherein the second wire is arranged in the second slot in plural turns forming a second coil. The number of series turns per phase per slot is equal to N/m, where N is the number of series turns per phase per slot for a transducer with only one converter, and m is the number of parallel converters in the disclosed invention.

Different winding strategies may be employed. For example, the first coil may be formed by winding the first wire within two slots which are spaced apart such that five slots are in between (for two phases) or wherein eight slots are in between (for three phases), for example. By providing plural turns the efficiency of the stator arrangement when used in an electric generator may improved.

The first wire and the second wire may correspond to a first phase which is provided to the input terminal of the first converter and the second converter, respectively.

According to an embodiment of the present invention the stator arrangement further comprises another first wire arranged in another first slot, in particular circumferentially adjacent to the second slot, connected to another input terminal of the first converter; another second wire arranged in another second slot, in particular circumferentially adjacent to the other first slot, connected to another input terminal of the second converter.

The other first wire and the other second wire may correspond to second phases which are connected to the other input terminal of the first converter and the second converter, respectively.

Thereby, support for a second phase is provided. Further, also demagnetization due to the second phase may be diminished due to the configuration that the other first wire is arranged at a different circumferential position than the other second wire. In particular, a circumferential difference between the other first wire and the other second wire may be equal to a circumferential positional difference between the first wire and the second wire.

According to an embodiment of the present invention the stator arrangement further comprises a further first wire arranged in a further first slot, in particular circumferentially adjacent to the other second slot, connected to a further input terminal of the first converter; a further second wire arranged in a further second slot, in particular circumferentially adjacent to the further first slot, connected to a further input terminal of the second converter.

The further first wire and the further second wire may correspond to a third phase. Also demagnetization of the permanent magnet due to the third phase is reduced due to the configuration that the further first wire and the further second wire differ in their respective circumferential positions. In particular, a circumferential positional difference between the further first wire and the further second wire may be equal to a circumferential positional difference between the first wire and the second wire and may also be equal to a circumferential positional difference between the other first wire and the other second wire.

Thereby, a third phase may be provided as is usually used to deliver a power stream to a utility grid.

According to an embodiment of the present invention the stator arrangement further comprises at least one third wire arranged in at least one third slot, in particular circumferentially adjacent to the second slot, and connected to an input terminal of at least one third converter.

Thereby, a first phase of at least one third converter is provided. It may be provided more than one third wire for example two third wires, three third wires, four third wires or even more third wires, which are each connected to a respective input terminal of a same number of third converters. By having more converters correspondingly more slots per pole are required. The number of slots per pole may be equal to the number of supported phases times the number of converters.

According to an embodiment of the present invention the stator arrangement further comprises at least one other third wire arranged in at least one other third slot, in particular circumferentially adjacent to the other second slot, and connected to anther input terminal of the third converter.

Thereby, a second phase is provided which is supplied to the third converter.

According to an embodiment of the present invention the stator arrangement further comprises at least one further third wire arranged in at least one further third slot, in particular circumferentially adjacent to the further second slot, and connected to a further input terminal of the third converter.

Thereby, a third phase is provided for the third converter.

According to an embodiment of the present invention a number of slots per stator pole is equal to a number of converters times a number of phases, the number of phases being in particular equal to a number of input terminals of each converter.

In particular, the number of phases may be three and the number of converters may be two or three. Thereby, a good compromise is achieved for reducing demagnetization of the permanent magnet and limiting the number of slots.

According to an embodiment of the present invention it is provided an electromechanical transducer, in particular electric generator, in particular of a wind turbine, comprising a stator arrangement according to one of the embodiments described above and comprising and a rotor with plural permanent magnets, wherein during operation the first wire and the second wire are magnetically isolated from each other.

In particular, a magnetic influence of a current flowing in the first wire to a current flowing in the second wire may be relatively small due to a tooth in between the first wire and the second wire which effectively focuses magnetic field lines and/or magnetic flux within the tooth thereby prohibiting that the magnetic field lines extend to the space where the respective other wire is arranged.

Thereby, if one of the first wire and the second wire fails or shows a short circuit, the respective other wire is not affected in an excessive manner thereby decreasing the risk of deteriorating, in particular demagnetizing, other components, such as the permanent magnets.

According to an embodiment of the present invention the transducer is adapted to allow a first current flowing in the first wire which has a same direction as a second current flowing in the second wire but which has a different phase than the second current. The different phase is due to the different circumferential positions of the first wire and the second wire. The phase difference may depend on the circumferential positional difference between the first wire and the second wire.

According to an embodiment of the present invention the second converter is controlled taking into account a phase shift of the phases of the first current and the second current which is in particular 360°/(6*q), wherein q is the number of slots per stator pole.

This may apply when three phases are supported and when two converters are present.

In case of three converters or more, the $3^{rd}$ or $4^{th}$ or $n^{th}$ converter must also give a phase shift of $(n-1)*360°/(6*q)$ in relation to the current of the $1^{st}$ converter.

According to an embodiment of the present invention the transducer is adapted for operation in the case of a fault in one of the first wire, the second wire, the at least one third wire, the first converter, the second converter, and the at least one third converter, wherein in the case of the fault a demagnetization of the plural permanent magnets is avoided.

In case of a fault the faulty component may be switched off and the operation of the transducer may be continued with the still unimpaired components. During the fault a high current may flow in the faulty component, such as one of the wires or one of the converters. Thereby, a high magneto motive force (MMF) acting on the permanent magnets may be reduced or even avoided by an effective magnetic isolation between adjacent wires. Thereby, demagnetization of the permanent magnets may be reduced or even avoided. Thereby, less expensive rare earth material may required for the magnets or/and thinner magnets may be employed. Thereby, the costs of the transducer may be reduced.

Compared to a conventional electric generator or stator arrangement the number of slots per pole is increased by a factor corresponding to the number of converters, thus by two for a two-converter system and three for a three-converter system and so on. Keeping the stator dimensions fixed, the slot width may be reduced to half, one third, etc., while the slot height may be kept fixed.

Although the aspect ratios may be maintained the same between different numbers of slots per pole for clearer comparison, by changing the number of slots, all the other dimensions may be varied based on a re-optimization procedure, based on which for example slot width and height or the magnet dimensions and shape may be optimally redefined.

By embodiments of the present invention cheaper magnets may be employed for the same performance of the electric generator. This is enabled by reducing the short circuit magneto motive force so that a lower coercivity is needed thereby a lower amount of Dysprosium is required for the permanent magnets leading to significantly cheaper magnets. Further, the radial thickness of the permanent magnets may be optimized or reduced with less limitation and force from the demagnetization perspective.

The windings of a particular phase (for example the first wire and the second wire connected to the first converter and the second converter, respectively) may be magnetically isolated from each other so that the short circuit current in one of the wire is not amplified due to the mutual magnetic interaction with the respective other wire.

In particular, the parallel phases (i.e. the first wire and the second wire) are disposed circumferentially adjacent to each other with a ferromagnetic tooth in between, wherein this tooth separates the first slot from the second slot.

Thereby, the short circuit magneto motive force as experienced by the individual permanent magnet is as follows:

$$MMF = N/m \cdot (k \cdot \lambda \sim I_n + I_n + I_n + \ldots),$$

wherein N is the number of series half turns per slot, k is the ratio of the short circuit current to the nominal full-load current, m is the number of parallel converters, λ is the modulation factor due to mutual inductance between the two parallel phases. Thereby, complete isolation is achieved for the case λ=1.

Compared to a conventional system the MMF (magneto motive force) is reduced by 30% for a two-converter system and 40% for a three-converter system and by an even larger amount, i.e. >40%, with even a higher number of converters is employed.

Embodiments of the present invention are now described with reference to the accompanying drawings. The invention is not limited to the illustrated or described embodiments.

DETAILED DESCRIPTION

Figure 1:
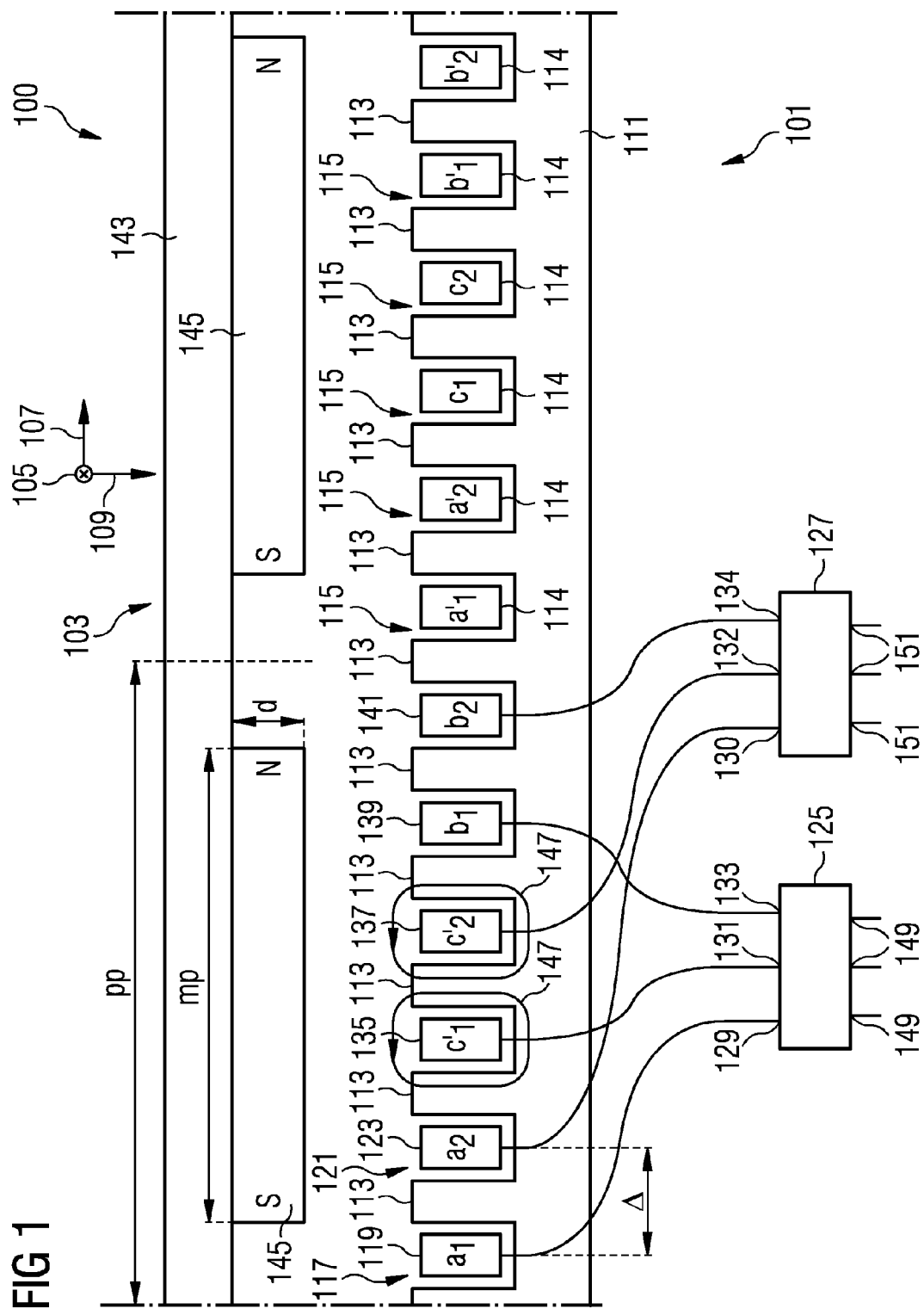
FIG. 1 schematically illustrates an axial view of a portion of an electric generator according to an embodiment of the present invention.

FIG. 1 schematically illustrates a portion 100 of an electric generator according to an embodiment of the present invention.

In particular, the illustration of the stator arrangement 101 comprises two stator poles, wherein the stator pole pitch pp is indicated in FIG. 1.

The portion 100 of the electric generator comprises a stator arrangement 101 and a rotor 103 rotating relative to the stator arrangement 101 around a rotation axis 105 which is oriented along an axial direction. The arrangement 100 is illustrated in FIG. 1 in a rolled-up version in which the circumferential direction 107 is bent from a circular direction to a straight direction for clarity. The axial direction is indicated by reference sign 105 (pointing into the drawing plane) and the radial direction is indicated by reference sign 109.

The stator arrangement 101 comprises a yoke 111 from which plural teeth 113 protrude radially outwards. The yoke 111 and the teeth 113 are manufactured from a magnetically permeable material. The plural teeth 113 alternate with plural slots 115.

In the plural slots plural wires 114 are arranged. For example, in a first slot 117 a first wire 119 is arranged and in a second slot 121 a second wire 123 is arranged. Thereby, the first slot 117 is arranged at a circumferential different position than the second slot 121 such that also the first wire 119 is circumferentially arranged at a different position than the second wire 123. The circumferential difference between the positions of the centers of the first wire 119 and the second wire 123 is indicated as Δ which may result in the property that electric phases of currents flowing in the first wire 119 and the second wire 123 are different.

The stator arrangement 101 further comprises a first converter 125 and a second converter 127 which may be constructed substantially in a same manner. The first converter has an input terminal 129, another input terminal 131 and a further input terminal 133. Also the second converter 127 has an input terminal 130, another input terminal 132 and a further input terminal 134. The first wire 119 is connected to the input terminal 129 of the first converter 125 and the second wire 123 is connected to the input terminal 130 of the second converter 127.

Another first wire 135 (arranged in a slot adjacent to the second slot 121 and thus adjacent to the second wire 123) is connected to the other input terminal 131 of the first converter and another second wire 137 (arranged in a slot adjacent to the other first wire 135) is connected to the other terminal 132 of the second converter 127. A further first wire 139 is connected to the further input terminal 133 of the first converter 125 and a further second wire 141 is connected to the further input terminal 134 of the second converter 127.

In FIG. 1, the first wire 119 is also labeled as $a_1$ and the second wire 121 is also labeled as $a_2$, the other first wire 135 is labeled $c'_1$ and the other second wire 137 is labeled $c'_2$, the further first wire 139 is labeled $b_1$ and the further second wire 141 is labeled $b_2$. Thereby, unprimed quantities indicate an inward direction and primed quantities indicate an outward direction of the orientation or the current direction, respectively.

Further, the generator portion 100 comprises a rotor 103 which comprises a support structure 143 which holds permanent magnets 145 having a south pole and a north pole as indicated by the letters "S" and "N" in FIG. 1. The permanent magnets 145 comprise as a rare earth material Dysprosium but to a smaller amount than in a conventional system and have a radial width d which is also smaller than a radial width of a conventional magnet. In FIG. 1 magnetic field lines 147 produced by some wires 114 are exemplarily indicated which in particular cancel out in the tooth 113 in between the wires 135 and 137. Further, the magnetic flux towards the permanent magnet 145 is reduced compared to a conventional magnetic flux. Thereby, demagnetization of the permanent magnets 145 is reduced or may be even avoided.

If one of the first converter 125 and the second converter 127 fails or a corresponding wire fails, the respective other converter may still operate in order to maintain energy production, albeit to the lesser degree.

The converters 125, 127 generate at output terminals 149 and 151, respectively, a fixed frequency AC power stream (in three phases) which may then be provided, in particular via one or more transformers, to a utility grid.

As is obvious from FIG. 1 three phases (corresponding to the three respective input terminals of the converters) are supported and the number of slots 115 per pole is six, e.g. the number of phases (three phases) multiplied by the number of converters (two converters).

Figure 2:
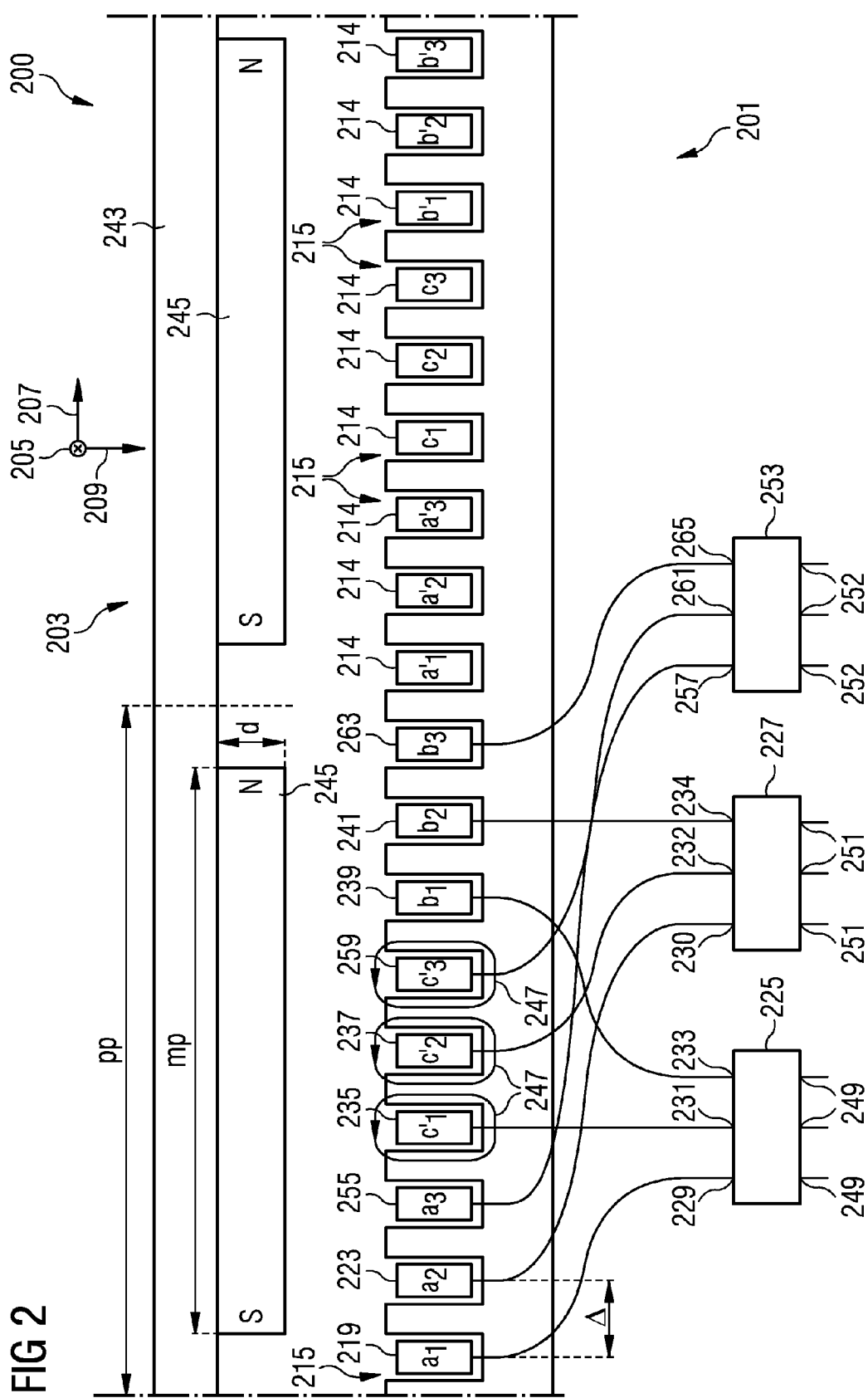
FIG. 2 schematically illustrates another embodiment of a portion of an electric generator according to an embodiment of the present invention.

FIG. 2 schematically illustrates a portion 200 of an electric converter according to an embodiment of the present invention. Thereby, elements and components similar in structure and/or function are labeled with the same reference signs as those structures and components illustrated in FIG. 1 except for the first digit. Thereby, explanation of these components can be taken from the respective description of those components as described in FIG. 1.

The portion 200 of the electric generator illustrated in FIG. 2 shows similarities to the portion 100 of the electric generator illustrated in FIG. 1. Differing from the electric generator portion illustrated in FIG. 1 the electric generator portion 200 illustrated in FIG. 2 comprises not only two but three converters 225, 227 and 253. The connections of the first wire 219, the other first wire 235 and the further first wire 239 to the first converter 225 correspond to the connections as explained with reference to FIG. 1. Further, the connections of the second wire 223, the other second wire 237 and the further second wire 241 to the second converter 227 correspond to those as illustrated and explained in FIG. 1.

Additionally, a third wire 255 (arranged in a slot adjacent to the other first wire 223) is connected to an input terminal 257 of the third converter 253, another third wire 259 (arranged in a slot adjacent to the other second wire 237) is connected to another input terminal 261 of the second converter and a further third wire 263 (arranged in a slot adjacent to the other third wire 241) is connected to a further input terminal 265 of the third converter 253. Thereby, if one of the converters 225, 227, 253 or two of those converters brake or fail, still the electric generator may provide electric energy via the corresponding output terminals 249, 251 and/or 252 or the unimpaired converters to a utility grid.

Further, the pole pitch pp and the magnet pitch mp are indicated in FIG. 2, as well as the radial width d of the permanent magnets 245. In particular, in FIGS. 1 and 2 the parallel phases (i.e. the phases carried by the wires 219, 223 and 255, also labeled as $a_1$, $a_2$ and $a_3$ are disposed circumferentially adjacent to each other having a circumferential distance Δ which depends on the pole pitch, the number of converters and the number of phases.

The short circuit MMF generated when currents are flowing through the wires opposing one of the magnets 245 is given as $$MMF = M/m \cdot (k \cdot \lambda \cdot I_n + I_n + I_n + \ldots).$$

Thereby, M is the number of series half turns per slot, k is the ratio of the short circuit current to the nominal full-load current, m is the number of parallel converters, λ is the modulation factor to mutual inductance between the two parallel phases. In the present situation λ is approximately one indicating an at least approximately complete isolation between adjacent wires.

Figure 3:
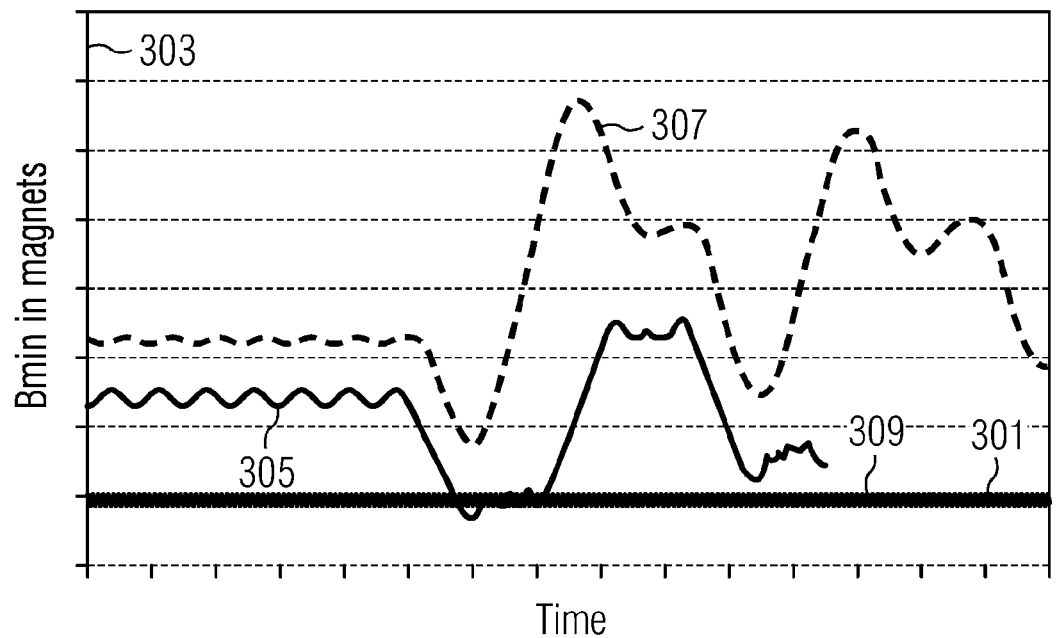
FIG. 3 illustrates a time course of a minimal magnetic field as observed in an electric generator according to an embodiment of the present invention.

FIG. 3 illustrates a graph, wherein on an abscissa 301 the time is indicated in seconds (sec), while on an ordinate 303 the minimal magnetic field in Tesla (T) is indicated. Thereby, the curve 305 illustrates a conventional electric generator, while the curve 307 illustrates the behavior of an electric generator according to an embodiment of the present invention, such as a generator illustrated in one of the FIG. 1 or 2.

As can be appreciated from FIG. 3, the minimal magnetic field of the generator according to an embodiment of the present invention (curve 307) does not fall below the threshold line 309 below of which a demagnetization of the permanent magnet 245 or 145 would occur, as in the conventional case (curve 305). Thus, according to this embodiment demagnetization of the permanent magnet 145, 245 is reduced or even avoided.

As is apparent from FIG. 3, the minimum flux density or minimal magnetic field Bmin is in a significantly safer zone compared to a conventional generator.

Figure 4:
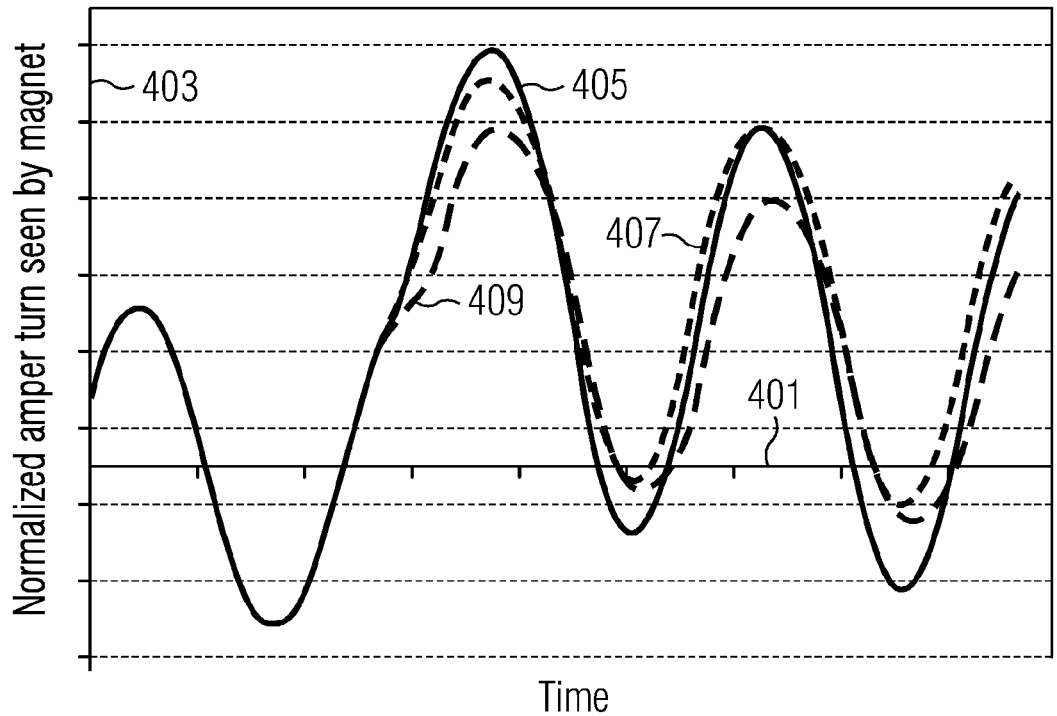
FIG. 4 illustrates a graph illustrating an equivalent of a magnetic motive force as generated in an electric generator according to an embodiment of the present invention.

FIG. 4 illustrates a graph wherein on an abscissa 401 the time and seconds is indicated while on an ordinate 403 the normalized Ampere turn as experienced by the magnet 145, 245 is indicated in Ampere (A). Thereby, the normalized Ampere turn is proportional to the magneto motive force (MMF) experienced by the magnets 145, 245. While the curves 405, 407 illustrate conventional systems, the curve 409 illustrates the normalized Ampere turn as observed in an electric generator according to an embodiment of the present invention, such as generators 100 or 200 illustrated in FIG. 1 or 2. As is apparent from FIG. 4 the normalized Ampere turn of the generator according to an embodiment of the present invention (curve 409) is lower than those of conventional systems (curves 405, 407). Thus, demagnetization of the permanent magnets 145, 245 is reduced or even avoided.

Figure 5:
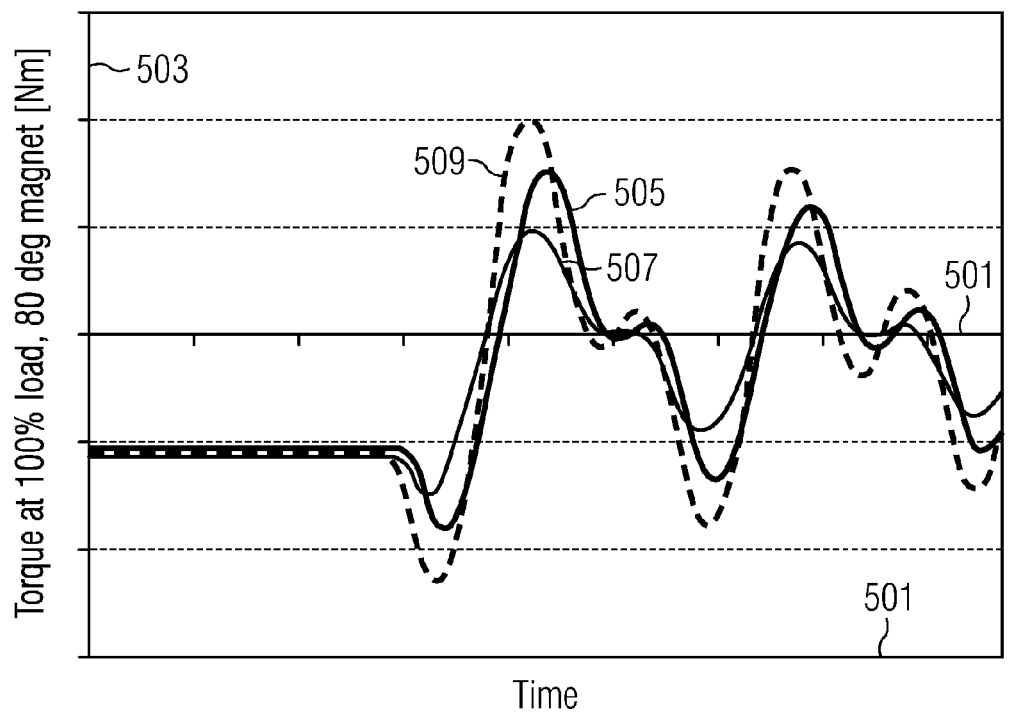
FIG. 5 illustrates a graph of an average torque as generated in an electric generator according to an embodiment of the present invention.
Figure 6:
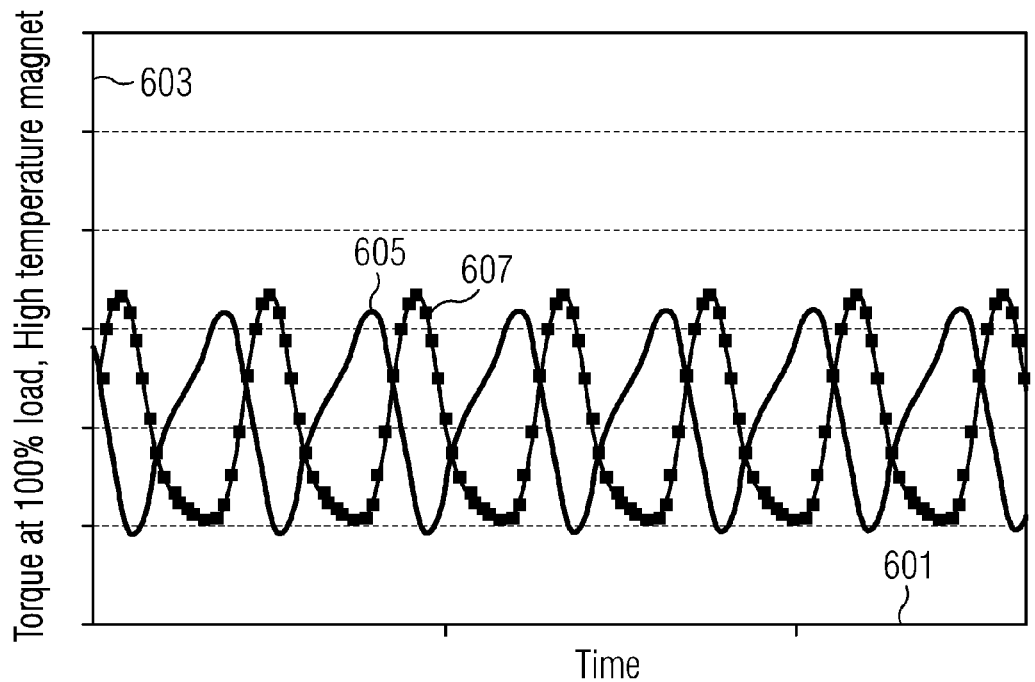
FIG. 6 illustrates a ripple of a torque as generated in an electric generator according to an embodiment of the present invention.

FIGS. 5 and 6 illustrate graphs depicting the average torque (FIG. 5) and ripple torque (FIG. 6) as observed in an electric generator according to an embodiment of the present invention. In FIG. 5, the first few cycles correspond to the normal operating conditions, and the following cycles correspond to when the short circuit occurs. Thereby, abscissas 501 and 601 indicate the time in seconds, while ordinates 503 and 603 indicate the torque at 100% load at a temperature of the magnets 145, 245 of high temperature in Newton*m (Nm). Thereby, the curve 605 in FIG. 6 illustrates the ripple torque in a generator according to an embodiment of the present invention which substantially corresponds to a conventional ripple torque. Thereby, the curve 607 corresponds to a behavior of a conventional system.

As is indicated as curve 505 in FIG. 5 the average torque according to a generator according to an embodiment of the present invention substantially corresponds to a conventional average torque. Thereby, the curves 507 and 509 correspond to a behavior of a conventional system.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. Stator arrangement, comprising:
   a stator extending in a circumferential direction and having plural teeth alternating with plural slots arranged along the circumferential direction;
   a first wire arranged in a first slot of the plural slots;
   a second wire arranged in a second slot of the plural slots, wherein the second slot is circumferentially adjacent to the first slot;
   a first converter having an input terminal connected to the first wire;
   a second converter having an input terminal connected to the second wire;
   wherein a number of slots per stator pole is equal to a number of converters times a number of phases;
   wherein the first wire is connected in a same inward axial direction to the first converter as the second wire is connected to the second converter, or the first wire is connected in a same outward axial direction to the first converter as the second wire is connected to the second converter; and
   wherein a first current flowing in the first wire has a same direction as a second current flowing in the second wire but has a different phase than the second current.

2. The arrangement according to claim 1, wherein a tooth of the plural teeth is circumferentially between the first slot and the second slot.

3. The arrangement according to claim 1, wherein the first wire is arranged in the first slot in plural turns forming a first coil, wherein the second wire is arranged in the second slot in plural turns forming a second coil.

4. The arrangement according to claim 1, further comprising:
   another first wire arranged in another first slot, circumferentially adjacent to the second slot, connected to another input terminal of the first converter;
   another second wire arranged in another second slot, circumferentially adjacent to the other first slot, connected to another input terminal of the second converter.

5. The arrangement according to claim 1, further comprising:
   a further first wire arranged in a further first slot, circumferentially adjacent to the other second slot, connected to a further input terminal of the first converter;
   a further second wire arranged in a further second slot, circumferentially adjacent to the further first slot, connected to a further input terminal of the second converter.

6. The arrangement according to claim 1, further comprising:
   at least one third wire arranged in at least one third slot, circumferentially adjacent to the second slot, and connected to an input terminal of at least one third converter.

7. The arrangement according to claim 6, further comprising:
at least one other third wire arranged in at least one other third slot, circumferentially adjacent to another second slot, and connected to anther input terminal of the third converter.

8. The arrangement according to claim 7, further comprising:
at least one further third wire arranged in at least one further third slot, circumferentially adjacent to the further second slot, and connected to a further input terminal of the third converter.

9. The arrangement according to claim 1, wherein the number of phases is equal to a number of input terminals of each converter.

10. Electro mechanical transducer, comprising:
a stator arrangement, comprising:
a stator extending in a circumferential direction and having plural teeth alternating with plural slots arranged along the circumferential direction,
a first wire arranged in a first slot of the plural slots,
a second wire arranged in a second slot of the plural slots, wherein the second slot is circumferentially adjacent to the first slot,
a first converter having an input terminal connected to the first wire,
a second converter having an input terminal connected to the second wire,
wherein a number of slots per stator pole is equal to a number of converters times a number of phases;
a rotor with plural permanent magnets,
wherein, during operation of the transducer, the first wire and the second wire are magnetically isolated;
wherein the first wire is connected in a same inward axial direction to the first converter as the second wire is connected to the second converter, or the first wire is connected in a same outward axial direction to the first converter as the second wire is connected to the second converter; and
wherein the transducer is configured such that a first current flowing in the first wire has a same direction as a second current flowing in the second wire but has a different phase than the second current.

11. The transducer according to claim 10, wherein the second converter is controlled taking into account a phase shift of the phases of a first current and a second current which is 360°/(6*q), wherein q is the number of slots per stator pole.

12. The transducer according to claim 10, wherein the transducer is configured for operation in case of a fault in one of the first wire, the second wire, at least one third wire, the first converter, the second converter, and at least one third converter, wherein in the case of the fault a demagnetization of the plural permanent magnets is avoided.

13. The transducer according to claim 10, wherein the transducer is an electric generator.

* * * * *